US009241081B2

(12) United States Patent
Muramoto et al.

(10) Patent No.: US 9,241,081 B2
(45) Date of Patent: Jan. 19, 2016

(54) IMAGE PROCESSING DEVICE, IMAGE FORMING APPARATUS, AND IMAGE PROCESSING METHOD

(71) Applicant: KYOCERA DOCUMENT SOLUTIONS INC., Osaka-shi (JP)

(72) Inventors: Hideya Muramoto, Osaka (JP); Kunihiko Tanaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/142,453

(22) Filed: Dec. 27, 2013

(65) Prior Publication Data

US 2014/0185070 A1    Jul. 3, 2014

(30) Foreign Application Priority Data

Dec. 28, 2012  (JP) ................................ 2012-286864
Dec. 28, 2012  (JP) ................................ 2012-286872

(51) Int. Cl.
| | |
|---|---|
| *H04N 1/40* | (2006.01) |
| *H04N 1/00* | (2006.01) |
| *H04N 1/48* | (2006.01) |
| *H04N 1/50* | (2006.01) |
| *H04N 1/46* | (2006.01) |

(52) U.S. Cl.
CPC ............. *H04N 1/00278* (2013.01); *H04N 1/46* (2013.01); *H04N 1/48* (2013.01); *H04N 1/50* (2013.01)

(58) Field of Classification Search
CPC .......... H04N 1/46; H04N 1/56; H04N 1/405; H04N 17/00; H04N 1/40; H04N 1/6033; G09G 2320/0666; G09G 2320/0242; G09G 2340/06
USPC ............ 358/1.9, 2.1, 468, 527; 382/162–167
See application file for complete search history.

(56) References Cited

U.S. PATENT DOCUMENTS 7,526,133 B2 *  4/2009  Nomizu et al. ............... 382/232
7,746,500 B2    6/2010  Sadowara
(Continued)

FOREIGN PATENT DOCUMENTS

JP          63-107274 A      5/1988
JP          2000-209445 A    7/2000
(Continued)

OTHER PUBLICATIONS

An Office Action; "Notice of Reasons for Rejection," issued by the Japanese Patent Office on Mar. 3, 2015, which corresponds to Japanese Patent Application No. 2012-286872 and is related to U.S. Appl. No. 14/142,453.

(Continued)

*Primary Examiner* — Thomas D Lee
*Assistant Examiner* — Stephen M Brinich
(74) *Attorney, Agent, or Firm* — Studebaker & Brackett PC

(57) ABSTRACT

An image processing device includes a mode instruction information obtaining section, a color determination threshold storage section, a mode determination section, and an automatic color determination threshold adjustment section. The mode determination section, using a color determination threshold, determines a mode to be a color mode when the image data belongs to a color mode range, and determines the mode to be a monochrome mode when the image data belongs to a monochrome mode range. The automatic color determination threshold adjustment section adjusts the color determination threshold so as to widen a mode range corresponding to the mode determined by the mode determination section, when the mode indicated by the instruction information obtained by the mode instruction information obtaining section is different from the mode determined by the mode determination section.

7 Claims, 9 Drawing Sheets

(56) References Cited

U.S. PATENT DOCUMENTS

2006/0008139 A1*  1/2006  Hirota et al. .................. 382/162
2006/0061586 A1*  3/2006  Brulle-Drews et al. ....... 345/594
2007/0285733 A1*  12/2007  Sadowara ..................... 358/445

FOREIGN PATENT DOCUMENTS

| JP | 2005-045372 A | 2/2005 |
| JP | 2007-336550 A | 12/2007 |
| JP | 2011-071659 A | 4/2011 |
| JP | 2011-142409 A | 7/2011 |

OTHER PUBLICATIONS

An Office Action; "Notice of Reasons for Rejection," issued by the Japanese Patent Office on Mar. 3, 2015, which corresponds to Japanese Patent Application No. 2012-286864 and is related to U.S. Appl. No. 141142,453.

* cited by examiner

| Mode (specified by user) | Result of ACS determination | Control after scan | Result after output |
|---|---|---|---|
| Monochrome | Color | Display dialog, without output | Output only in the specified mode |
| | Monochrome | Output only | |
| Color | Color | Output only | |
| | Monochrome | Display dialog, without output | Output only, when the mode is still color mode. Adjust ACS threshold after output, when the mode is changed to monochrome mode |

FIG. 9

IMAGE PROCESSING DEVICE, IMAGE FORMING APPARATUS, AND IMAGE PROCESSING METHOD

INCORPORATION BY REFERENCE

The present application claims priority under 35 U.S.C. §119 to Japanese Patent Applications No. 2012-286872 and No. 2012-286864 filed Dec. 28, 2012. The contents of this application are incorporated herein by reference in their entirety.

BACKGROUND

The present application relates to image processing devices, image forming apparatuses, and image processing methods, and particularly to an image processing device, an image forming apparatus, and an image forming method for performing automatic color determination that is to automatically determine whether to perform color output or monochrome output.

Known as an image forming apparatus is a copier or a multifunctional peripheral (MFP) that includes only a set of an image reading section, such as a scanner, which optically reads a color image to perform an input of the image and an image forming section that is an image reproduction unit, and is capable of color printing by repeating a development process a plurality of times.

In the image forming apparatus capable of color printing, in the case of printing by color output, development processes are sequentially performed using toners in four colors of cyan (C), magenta (M), yellow (Y), and black (K) or a toner in each of the three colors of C, M, and Y, and these colors are overlaid on a sheet of recording paper to express colors.

In addition, in the case of printing by monochrome output, one image is recorded in one development process. Therefore, in this type of image forming apparatus, the time required for a copy operation substantially differs between an operation mode for color output and an operation mode for monochrome (single-color) output.

This required the operator (user) to pay attention to switching between the color output and the monochrome output, and to perform an operation to appropriately switch the copy mode according to the type of the document.

Some image data processing device performs control of the device, based on the data level of each color component and a ratio thereof, for the purpose of saving this type of trouble of switching the color mode.

Some image data processing device can automatically determine whether the document is colored or monochrome, and automatically switch the operation mode of the copier between the color output and the monochrome output according to the result of the determination (Auto Color Select, hereinafter referred to as "ACS").

In addition, some image processing device includes a determination section that automatically determines, based on the input of the image data, whether the image is monochrome or colored, and an adjustment section that adjusts criteria for determination that is used for the determination performed by the determination section.

Some image processing device, having configuration that allows the user to adjust the levels of adjustment for black and white and the colors, which is performed in the monochrome/color determination section, thus reducing mistakes in the black and white/color determination.

SUMMARY

The image processing device according to the present disclosure includes a mode instruction information obtaining section, a color determination threshold storage section, a mode determination section, and an automatic color determination threshold adjustment section. The mode instruction information obtaining section obtains, from a user, instruction information that indicates in which mode, a color mode or a monochrome mode, the image data is to be output. The color determination threshold storage section stores a color determination threshold that specifies which mode range, a color mode range or a monochrome mode range, the image data belongs to. The mode determination section determines the mode to be the color mode, using the color determination threshold, when the image data belongs to the color mode range, and determines the mode to be the monochrome mode, using the color determination threshold, when the image data belongs to the monochrome mode range. The automatic color determination threshold adjustment section adjusts the color determination threshold so as to widen the mode range corresponding to the mode determined by the mode determination section, when the mode indicated by the instruction information obtained by the mode instruction information obtaining section is different from the mode determined by the mode determination section.

An image forming apparatus according to the present disclosure includes an image forming section that prints the image data in the color mode or in the monochrome mode, according to the mode determined by the image processing device described above.

An image processing method according to the present disclosure includes: obtaining, from a user, mode instruction information indicating in which mode, a color mode or a monochrome mode, image data is to be output; determining the mode to be the color mode, using a color determination threshold, when the image data belongs to a color mode range, and determining the mode to be the monochrome mode, using the color determination threshold, when the image data belongs to a monochrome mode range, the color determination threshold specifying which mode range, the color mode range or the monochrome mode range, the image data belongs to; and adjusting the color determination threshold so as to widen the mode range corresponding to the determined mode when the mode indicated by the obtained instruction information is different from the determined mode.

BRIEF DESCRIPTION OF THE DRAWINGS

FIG. 9 is a conceptual diagram showing an example of automatic color determination adjustment processing according to an embodiment of the present disclosure.

DETAILED DESCRIPTION

Embodiment 1

Configuration of an Image Forming Apparatus 1

Next, with reference to FIG. 1 and FIG. 2, the configuration of an image forming apparatus 1 according to an embodiment of the present disclosure will be described in detail.

Figure 1:
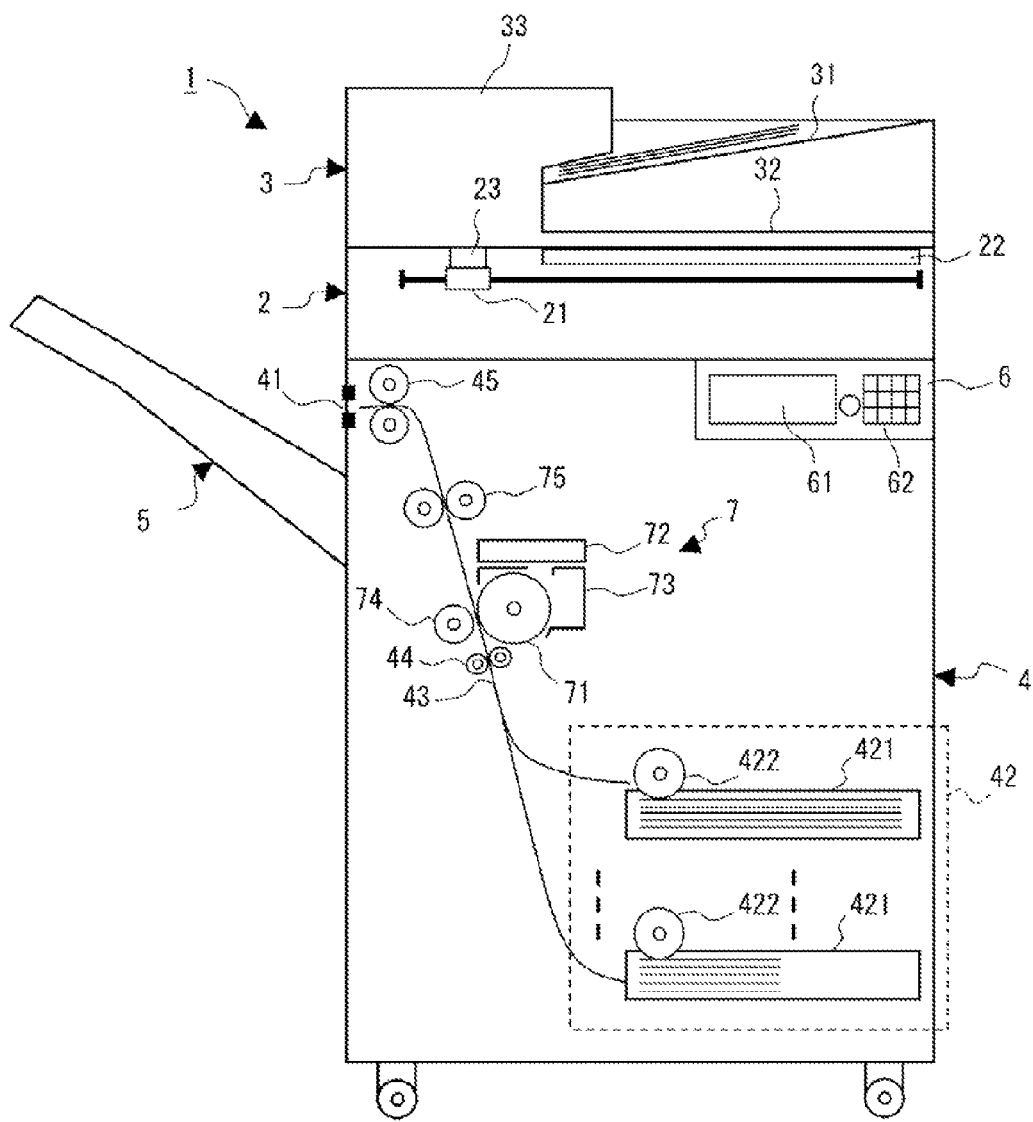
FIG. 1 is a schematic cross-sectional view showing an internal configuration of an image forming apparatus 1 according to an embodiment of the present disclosure.

As shown in FIG. 1, the image forming apparatus 1 (image processing device) according to the present embodiment includes: a document reading section 2 (reading section), document feeding section 3, a main body 4, a stack tray 5, an operation panel section 6 (a display section, and a mode instruction information obtaining section).

The document reading section 2 is provided on the main body 4. The document feeding section 3 is provided on the document reading section 2. The stack tray 5 is provided on a side of the exit port 41 for recording sheet. An exit port 41 for the recording sheet is formed in the main body 4. In addition, the operation panel section 6 is provided on a front side of the image forming apparatus 1.

The document reading section 2 includes a scanner 21, platen glass 22, and a document reading slit 23. The scanner 21 includes an exposure lamp, and a charge coupled device (CCD) or a complementary metal oxide semiconductor (CMOS) imaging sensor, and so on. The scanner 21 is configured so as to be movable in a direction in which the document is carried by the document feeding section 3. The platen glass 22 is a document holder formed of a transparent member such as glass. The document reading slit 23 includes a slit formed in a direction orthogonal to the direction in which the document is carried by the document feeding section 3.

The document reading section 2 can automatically recognize document sizes for each document, such as a name card to A3, and read (scan) an image within a predetermined range corresponding to the recognized size.

When reading the document placed on the platen glass 22, the scanner 21 is shifted to a position opposite to the platen glass 22. Then the scanner 21 obtains image data by reading the document while scanning the document placed on the platen glass 22, and providing an output of the obtained image data to the main body 4. The image data includes a plurality of pixel data. In addition, the image data includes a plurality of page data.

In addition, when reading the document carried by the document feeding section 3, the scanner 21 is shifted to a position opposite to the document reading slit 23, and obtains the image data, via the document reading slit 23, by reading the document in synchronization with the operation of performed by the document feeding section 3, and provides an output of the obtained image data to the main body 4.

The document feeding section 3 includes a document placement section 31, a document ejection section 32, and a document conveyance mechanism 33. The document placed on the document placement section 31 is sequentially sent out one by one by the document conveyance mechanism 33 and carried to a position opposing the document reading slit 23. Subsequently, the document is ejected into the document ejection section 32. It should be noted that the document feeding section 3 has a folding configuration. By lifting up the document feeding section 3, it is also possible to allow the document feeding section 3 to function as a platen cover to open the top surface of the platen glass 22.

The main body 4 includes, as well as including the image forming section 7, a feeding section 42, a paper conveyance path 43, a conveyance roller 44, and an ejection roller 45. The feeding section 42 includes a plurality of paper feed cassettes 421 and a paper feed roller 422. The paper feed cassettes 421 store recording paper different in size or orientation.

The paper feed roller 422 sends out the recording paper one sheet each from the paper feed cassettes 421 onto the paper conveyance path 43. The paper feed cassettes 421 function as a paper holding section.

The paper feed roller 422, the conveyance roller 44, and the ejection roller 45 function as a conveyance section. The recording paper is carried by the conveyance section. The recording paper sent out by the paper feed roller 422 onto the paper conveyance path 43 is carried to the image forming section 7 by the conveyance roller 44.

Then, the recording paper on which the recording was performed by the image forming section 7 is ejected into the stack tray 5 by the ejection roller 45.

The operation panel section 6 includes a display section such as an LCD, a touch panel 61 for performing various types of instructions, a button section 62, and so on.

The touch panel 61 is a touch panel of the resistive membrane system or of the capacitance system. The touch panel 61 obtains instruction information by coordinates, pressing and so on that are pressed by the user on the display section. When the touch panel 61 is a panel compatible with multi touch, the touch panel 61 can detect a plurality of coordinates, pressing, and so on.

The button section 62 includes a start key, a numerical keypad, and buttons for obtaining instructions from the user regarding operation modes such as copy, scan, and so on, and print/transmission/receipt and so on of the selected document.

The touch panel 61 and the button section 62 in the operation panel section 6 obtain instructions from the user to the image forming apparatus 1. This allows performing user authentication and various types of directions through the touch panel 61 and the button section 62 in the operation panel section 6.

The image forming section 7 includes a photosensitive drum 71, an exposure section 72, a development section 73, and a transfer section 74, and a fixing section 75.

The exposure section 72 is an optical unit including a laser device, an LED array, a mirror, a lens, and so on. The exposure section 72 exposes the photosensitive drum 71 by emitting light and so on based on the image data. The exposure section 72 forms an electrostatic latent image on the surface of the photosensitive drum 71.

The development section 73 is a development unit that develops, using toner, the electrostatic latent image formed on the photosensitive drum 71. The development section 73 forms a toner image based on the electrostatic latent image, on the photosensitive drum 71. The transfer section 74 transfers the toner image formed on the photosensitive drum 71 by the development section 73, onto the recording paper. The fixing section 75 fixes the toner image onto the recording paper by heating the recording paper onto which the toner image has been transferred by the transfer section 74.

It should be noted that the document feeding section 3 includes a document detection sensor. When the document is placed on the document placement section 31, the document detection sensor detects the document including the size and number of pages. In addition, the document feeding section 3 also includes an open-close sensor, and so on. The open-close sensor detects opening or closing of the platen cover.

In addition, the main body 4 also includes a sensor that detects the opening and closing of the manual feed tray that is not shown, and detects the replacement of the paper feed cassette 421 and so on as a paper set. Other than this, each section includes a sensor for detecting a change in status.

The control section 8 detects a user instruction from these sensors and the operation panel section 6, and performs various types of jobs including scanning in a normal activation state.

Figure 2:
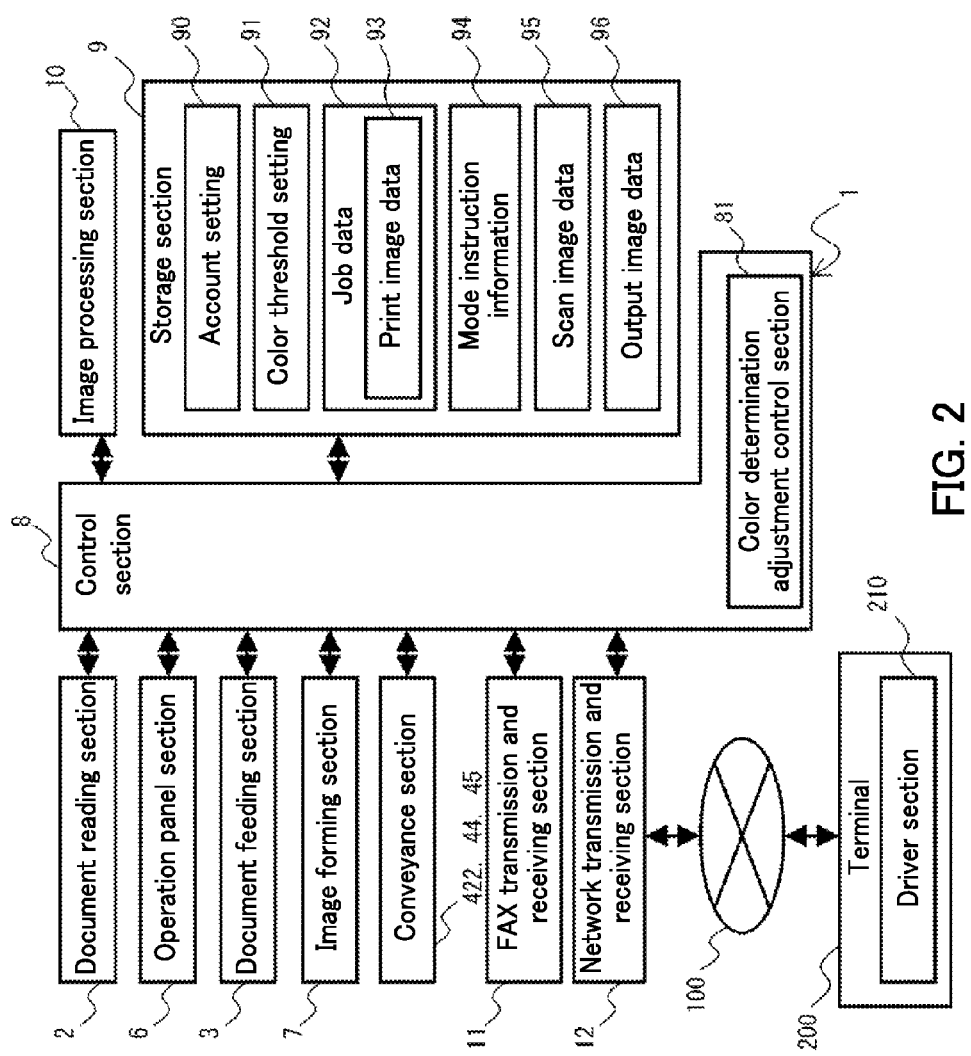
FIG. 2 is a block diagram showing an control configuration of the image forming apparatus 1 according to an embodiment of the present disclosure.

FIG. 2 shows a block diagram showing a schematic control configuration of the image forming apparatus 1. The document reading section 2, the document feeding section 3, the conveyance section (the paper feed roller 422, the conveyance roller 44, and the ejection roller 45), the operation panel section 6, and the image forming section 7 are connected to the control section 8, and the operations thereof are controlled by the control section 8. In addition, connected to the control section 8 are: a storage section 9, an image processing section 10, and a network transmission receiving section 12, and so on.

The control section 8 is an information processing section such as a microcomputer including a read only memory (ROM) and a random access memory (RAM). On the ROM, a control program for executing operation control of the image forming apparatus 1 is recorded.

The control section 8 reads the control program stored on the ROM. Then, the control section 8 controls the entire apparatus according to the user instruction information entered through the operation panel section 6, by developing the control program on the RAM. In addition, the control section 8 and the image processing section 10 can perform various types of control according to instructions from another terminal. In addition, the control section 8 or the image processing section 10 may separately include a dedicated circuit and an operation section for performing automatic color determination.

In addition, the control section 8 includes a color determination adjustment control section 81 (a mode determination section and a user authentication section).

The detailed configuration of the color determination adjustment control section 81 is to be described later.

The storage section 9 is a storage device such as a semiconductor memory, a hard disk drive (HDD), and so on.

The storage section 9 stores the image data, which has been read by the document reading section 2 and image-processed by the image processing section 10, as scan image data 95 that is a temporary file. In addition, the storage section 9 stores the data and so on such as various types of files and thumbnail images that are read from an outside recording medium.

In addition, the storage section 9 includes a storage folder for each user. This storage folder holds the scan image data 95 as filed data such as PDF and other image data and print data as network attached storage (NAS). In addition, these data may be transmitted to a terminal 200 via a network 100.

In addition, the storage section 9 functions as each of: an account setting storage section, a color determination threshold storage section, a job data storage section, a print data storage section, a mode instruction information storage section, a scan image data storage section, and an output image data storage section. The account setting storage section stores an account setting 90. The color determination threshold storage section stores a color threshold setting 91 (color determination threshold). The job data storage section stores job data 92 (print data). The print data storage section stores print image data 93. The mode instruction information storage section stores the mode instruction information 94. The scan image data storage section stores scan image data 95. The output image data storage section stores output image data 96.

The account setting 90 is a data base including various types of information of the image forming apparatus 1 for each user account. The account setting 90 includes, for each user identification (ID), encrypted authentication information and threshold information for the color and monochrome switching.

The authentication information includes a password, a user name, and so on that correspond to the user ID. The authentication information is used for user authentication (personal authentication). In addition, information regarding the authorities of the administrator, a general user, a guest, and so on is also included as the authentication information and so on used for printing or copying.

The threshold information includes, for each user, the color threshold setting 91 as shown below. After the user logs in, the control section 8 may write this threshold information in the color threshold setting 91 for each user, and perform each process. This threshold information may include the mode instruction information 94 for each user as shown below.

In addition, the account setting 90 may include a title and a location of the storage folder, an IP address, an e-mail address, a postal address, and so on of the user. In addition, the account setting 90 may further include a unique encryption key created from the authentication information, a unique number of the image forming apparatus 1, and so on.

The information of each user in the account setting 90 is entered or changed through the operation panel section 6. In addition, various types of information of the user may be entered and registered, from an external terminal that is not shown, another recording medium and so on connected to a recording medium connection section and so on.

In addition, a guest user may be registered with the account setting 90.

The color threshold setting 91 is a setting for a threshold for determining by ACS whether the scan image data 95 or the print image data 93 is a color image or a monochrome image. The color threshold setting 91 includes a plurality of ACS determination thresholds and a difference threshold for determining a difference of each ACS determination threshold.

The ACS determination thresholds are thresholds for selecting color output or monochrome output, according to the information of the color pixels in the scan image data 95 or the print image data 93. In other words, the color threshold setting 91 specifies which mode range, a color mode range or a monochrome mode range the image data belongs to. For the ACS determination thresholds, for example, a color pixel detection threshold, a color block threshold, a color line threshold, a color page threshold, and so on are used.

Of these, the color pixel detection threshold includes, for example, a U component threshold and a V component threshold for detecting color pixels when converting the image data in the RGB (red, green, and blue) format of the scan image data 95 or the job data 92 into the image data in the YUV format (luminance: Y component, and two color differences: U component=Blue−Y component; V component=Red−Y component). For a given (default) value of this color pixel detection threshold, for example, it is preferable to use a value equivalent approximately to one to a few percent of tones that can be expressed at the image forming section 7.

The color block threshold is a threshold for determining, as a "color block", a point where color pixels are continuous among a set of pixels in one line, which is, namely, a horizontal or vertical sub scanning line (hereinafter, referred to as a "scan line") of the scan image data 95 or the job data 92. In other words, when the number of the continuous color pixels is larger than this threshold, the point is determined as the color block. For the default value of the color block threshold, for example, it is preferable to use a value ranging approximately from 0.01% to a few percent of the total number of pixels on the scan line, with a minimum of 2 pixels.

The color line threshold is a threshold for determining whether the scan line is a color line or not. The color line threshold is a threshold indicating a size of the color block determined to be the color line. In other words, if a scan line includes a color block larger than the color line threshold, the scan line is determined to be the color line. It should be noted that values such as the total number, the total size, and so on of the color blocks on one scan line may be used for the color line threshold. For the default value for this color line threshold, for example, it is preferable to use a value ranging approximately from 1% to a few percent of the total number of the pixels on the scan line.

The color page threshold is a threshold for determining whether the page is a color page or not. The color line threshold is a threshold used for determining, from the ratio of the total number of scan lines determined to be the color lines, and so on, whether the page is a color page or not. For the default value of this color page threshold, for example, it is preferable to use a value ranging approximately from 0.1% to a few percent of the total number of the scan lines in the page.

Each value in the color threshold setting 91 is a variable value. Each value in the color threshold setting 91 is adjusted so as to be optimal, in the processing performed by the ACS determination threshold adjustment section 820 to be described later. If the range of adjustment (difference) is large, a question about the adjustment is asked by the user instruction. The difference threshold for determining the difference in each ACS determination threshold is referred to in this asking about the adjustment.

The job data 92 is the data related to various types of jobs. The job data 92 includes various types of data and so on, including: types of jobs, commands for executing functions, job ID (identification), user ID, page description language data, and print image data 93. Types of jobs include, for example, a print job, a scan job, a remote scan job, a copy job, a FAX transmission job, a FAX receiving job, and so on.

The print image data 93, in the print job and the FAX transmission job according to the present embodiment, is the image data generated by rasterizing (drawing) the print data in the page description language, which has been received from the terminal 200 or stored on an external recording medium that is not shown or in a storage folder in the storage section 9. After image-processed by the color determination adjustment control section 81 and the image processing section 10, the print image data 93 is recorded on the paper by the image forming section 7. In other words, the print image data 93 is the "original" image data that is not to be scanned and used for copying. In addition, the print image data 93 is the image data received by facsimile in the FAX receiving job in the present embodiment. In addition, in the scan job, the remote scan job, or the copy job in the present embodiment, the print image data 93 is the same image data as the scan image data 95 read from the document reading section 2.

The mode instruction information 94 is information on the instruction of the user to determine whether to perform color output or monochrome output by ACS determination. In other words, the mode instruction information 94 is information that specifies whether the output image at the time of copying or printing is an "image desired to be determined, by ACS determination, to be output in color" or the "image desired to be determined, by ACS determination, to be output in monochrome".

This mode instruction information 94 can be instructed and obtained by the user through the operation panel section 6 or a driver section 210 in the terminal 200.

It should be noted that this mode instruction information 94 may be directly included in the job data 92 or in the scan image data 95. In addition, at the time of automatic color determination, it is also possible to directly enter the instruction on the color mode.

The scan image data 95 is the image data which is mainly read by the document reading section 2 and on which image processing is performed by the image processing unit 10.

The scan image data 95 includes files such as: bit map image files in RGB colors, in monochrome, or in grey scale, files lightly compressed by run-length coding, LZW, and so on.

It should be noted that in the ACS determination according to the present embodiment, the scan image data 95, which is color scanned, for example, in RGB colors with each color having 8-bit or 16-bit tones, is used.

In addition, the scan image data 95 includes filed data such as PDF and TIFF, which has been generated by the image processing section 10 and the control section 8.

The output image data 96 is the image data printed out onto the recording paper by the image forming section 7. For the output image data 96, for example, with each color, regarding the half tone corresponding to the resolution printed by the image forming section 7, a bit map file and so on converted to black and white by dither, error diffusion, and so on are used.

The image processing section 10 is a control operation section such as a digital signal processor (DSP) and a graphics processing unit (GPU). The image processing section 10 performs predetermined image processing on the image data. The image processing section 10 performs various types of image processing including image improvement processing, for example, scaling, density adjustment, and tone adjustment.

The image processing section 10 generates the scan image data 95 by performing image processing on the image data read by the document reading section 2. When performing this, the image processing section 10 may be used for the operation for converting the image data into the image data in such formats as PDF and TIFF, or for adding digital watermark, or decoding. In addition, the image processing section 10 may perform image processing when drawing the job data 92 obtained from the terminal 200, perform image processing on the scan image data 95 when scanning, or perform image processing on the output image data 96 to be printed out.

A FAX transmission and receiving section 11 performs transmission and receiving by facsimile. The FAX transmission and receiving section 11 is connected to an ordinary telephone line, an ISDN line, and so on.

The FAX transmission and receiving section 11 directly outputs, from the image forming section 7, the image data received by facsimile, or stores the image data in the storage section 9 as the job data 92 in the FAX receiving job.

In addition, the FAX transmission and receiving section 11 can also output the job data 92 of the FAX transmission job received from the terminal 200, instead of developing and outputting the job data 92 at the image forming section 7.

The network transmission and receiving section 12 includes a LAN board, a wireless transmitter receiver, a telephone dialer, a coupler, and so on that are to be connected to the network 100. The network transmission and receiving section 12 is connected to the network 100 outside.

The network 100 is a network such as a LAN, a WAN, or a cellular phone telephone network.

The network transmission and receiving section 12 is connected to the terminal 200 via the network 100. The network transmission and receiving section 12 receives a job instruction from the terminal 200.

The terminal 200 is a personal computer (PC), a smart phone, and so on of the user. The terminal 200 performs various types of control by causing the control section to execute the driver section 210 stored in the storage section and obtaining the user instruction.

It should be noted that the image forming apparatus 1 may integrally form the control section 8, the image processing section 10, and so on, such as a CPU with a built-in GPU or a chip-on-module package.

In addition, the image forming apparatus 1 may include another image forming apparatus 1, or an upload section and so on for uploading to an outside server (not shown).

[Detailed Configuration of the Control Section 8]

Figure 3:
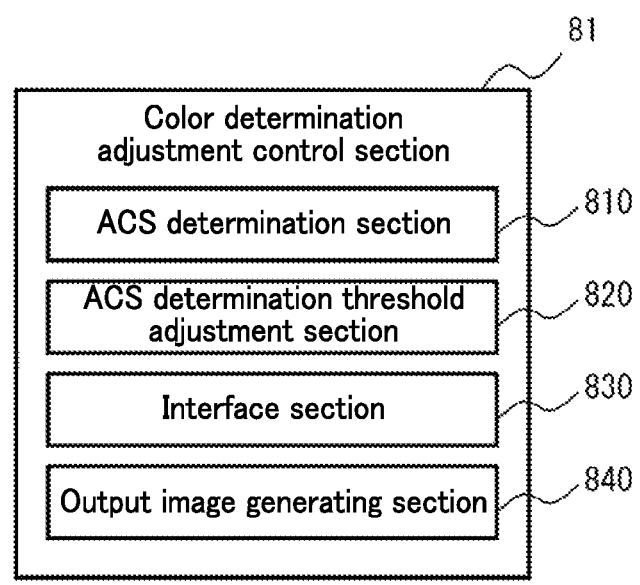
FIG. 3 is a block diagram showing a control configuration of a color determination adjustment control section 81 according to an embodiment of the present disclosure.

Here, with reference to FIG. 3, the detailed configuration of the color determination adjustment control section 81 in the control section 8 according to the present embodiment is described. FIG. 3 is a block diagram schematically showing a schematic control configuration of the color determination adjustment control section 81. The color determination adjustment control section 81 includes an ACS determination section 810 (mode determination section), ACS determination threshold adjustment section 820 (automatic color determination threshold adjustment section, and print data drawing section), an interface section 830 (color mode instruction information obtaining section), and an output image generating section 840.

The ACS determination section 810 determines, from the job data 92 or the scan image data 95, whether the image data is in color or monochrome using the threshold in the color threshold setting 91.

The ACS determination section 810, using the ACS determination threshold (color determination threshold), determines that the image data is in the color mode when the image data belongs to the color mode range, and determines that the image data is in the monochrome mode when the image data belongs to the monochrome mode range. In the present embodiment, the color mode range is a range where the image data does not exceed the ACS determination threshold. In addition, the monochrome mode range is a range where the image data does not exceed the ACS determination threshold.

The ACS determination threshold adjustment section 820 adjusts the ACS determination thresholds such as the color pixel detection threshold, the color block threshold, the color line threshold, and so on, based on an instruction to change the ACS determination thresholds, which instruction is entered by the user through the driver section in the terminal 200 or the operation panel section 6.

The interface section 830 communicates with the printer driver in the terminal 200, and thereby obtains a various types of instruction information from the terminal 200 and performs setting of the image forming apparatus 1, requests functions, and so on. The interface section 830 obtains, as the mode instruction information 94, the selection by the user between color output and monochrome output, that is, an instruction regarding the mode, at the time of print out at the image forming section 7. In addition, the interface section 830 provides an interface and so on for changing output conditions on the terminal 200 such as "aggregate output (such as 2 in1)". In addition, the interface section 830 obtains various types of user instructions from the operation panel section 6 in the same manner.

The output image generating section 840 performs image processing on the print image data 93 or the scan image data 95 according to the determined color mode, and generates the output image data 96 that is the image data to be printed out at the image forming section 7.

[Automatic Color Determination Adjustment Processing by the Image Forming Apparatus 1]

Next, with reference to FIG. 4, the automatic color determination adjustment processing by the image forming apparatus according to the embodiment of the present disclosure is described.

The automatic color determination processing according to the present embodiment includes processing at the time of scanning in which an image is read by the document reading section 2 and whether to perform color output or monochrome output is determined by ACS, and processing at the time of adjustment in which the threshold is adjusted in response to the input of the job data for printing.

Figure 4A:
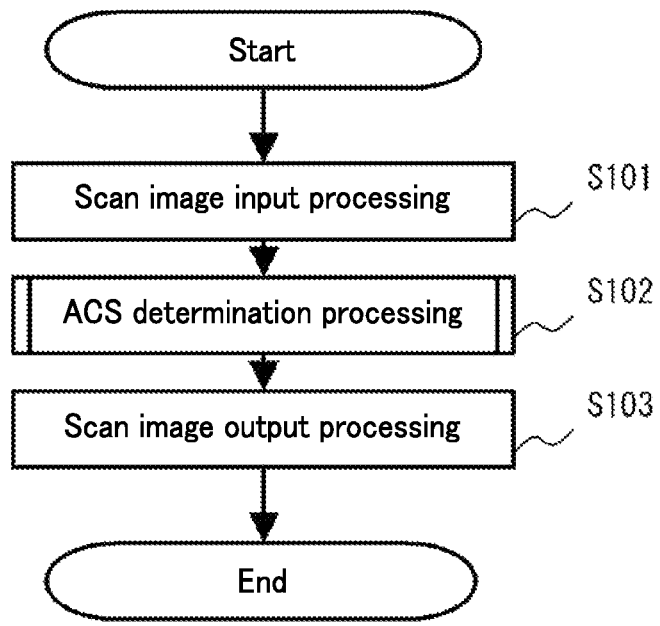
FIGS. 4A and 4B are flowcharts of automatic color determination adjustment processing according to an embodiment of the present disclosure.
Figure 4B:
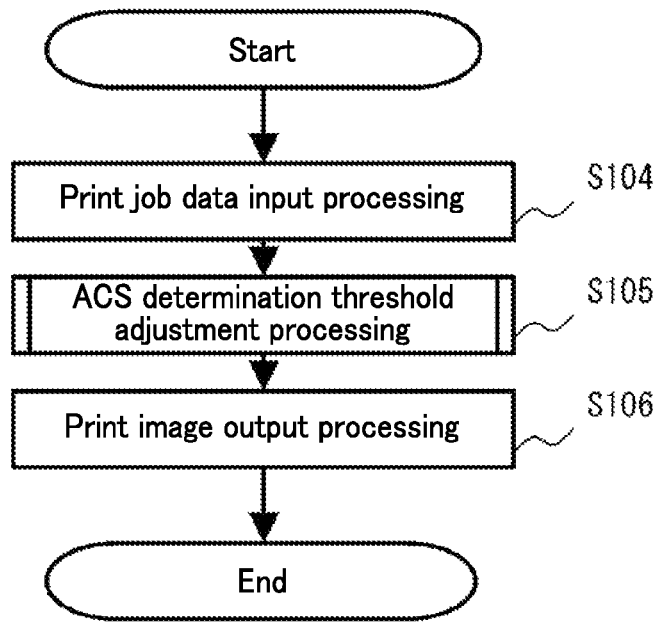

FIG. 4A shows processing at the time of scanning in the automatic color determination adjustment processing, and FIG. 4B shows processing for adjusting the threshold.

The following describes, according to each step, the automatic color determination adjustment processing in the present embodiment, using flowcharts in FIGS. 4A and 4B. The following processing is performed mainly by the color determination adjustment control section 81 in the control section 8, using hardware resources.

[Processing at the Time of Scanning]

(Step S101)

First, the color determination adjustment control section 81 performs scan image input processing.

The color determination adjustment control section 81 instructs to optically read the document placed on the document reading section 2 when an instruction such as copy, scan, remote scan, or facsimile transmission is accepted from the user through the touch panel 61 or the bottom section 62 in the operation panel section 6.

The image data read by the document reading section 2 is image processed by the image processing section 10 and store in the storage section 9 as the scan image data 95.

In addition, the color determination adjustment control section 81 obtains, through the operation panel section 6, the mode instruction information 94 that is the information providing an instruction as to whether the user desires color output or monochrome output, and stores the obtained mode instruction information 94 in the storage section 9.

(Step S102)

Next, the ACS determination section 810 performs ACS determination processing of the color determination adjustment control section 81.

The ACS determination section 810 automatically determines for each page, regarding the scan image data 95, whether the image data is to be output by color printing or to be output by monochrome printing.

The details of this ACS determination processing are to be described later.

(Step S103)

Next, the color determination adjustment control section 81 performs scan image output processing, mainly using the output image generating section 840.

The color determination adjustment control section 81 generates the output image data 96 from the scan image data 95 according to the determination that the image should be output by color printing or that the image should be output by monochrome printing, and the output image data 95 is printed at the image forming section 7.

When it is determined that the page should be printed in monochrome, the color determination adjustment control section 81 changes the colors of the output image data 96 from CMYK colors to the monochrome colors by performing predetermined weighting.

It should be note that the color determination adjustment control section 81 may prepare a PDF file or perform facsimile transmission.

As described above, the processing at the time of scanning in the automatic color determination processing is completed.
{Processing in Controlling the Threshold}
(Step S104)

First, the color determination adjustment control section 81 performs print job data input processing.

When the print job from the terminal 200 or the job data 92 of the fax transmission job is transmitted, the color determination adjustment control section 81 obtains and stores these data in the storage section 9.

In addition, the color determination adjustment control section 81 may obtain the job data 92 stored in the terminal 200, an external recording medium, or a storage folder, and may receive a facsimile from the FAX transmission and receiving section 11 so as to obtain the job data 92.

In performing this, the color determination adjustment control section 81 obtains the mode instruction information 94 from the driver section 210 of the terminal 200 through the interface section 830, and stores the mode instruction information 94 in the storage section 9.
(Step S105)

Next, the ACS determination threshold adjustment section 820 in the color determination adjustment control section 81 performs the ACS determination threshold adjustment processing that is a process for adjusting the threshold for ACS determination.

The ACS determination threshold adjustment section 820 calculates the number of color pixels in the print image data 93. Based on the mode instruction information 94 obtained in the image input processing in Step S101 and the number of the color pixels, each threshold in the color threshold setting 91 used for determining whether to output in color or in monochrome by ACS determination processing is adjusted.

The details of this ACS determination threshold adjustment processing are to be described later.
(Step S106)

Here, the color determination adjustment control section 81 performs print image output processing, mainly using the output image generating section 840.

The color determination adjustment control section 81 prints the output image data 96 by the image forming section 7, according to the determination to perform color output as described above.

It should be noted that here, likewise, the color determination adjustment control section 81 may perform generation of PDF files, facsimile transmission from the FAX transmission and receiving section 11, transmission to the terminal 200, uploading to a server that is not shown, other than the printing by the image forming section 7.

In addition, the color determination adjustment control section 81 may count each output in color or in monochrome, store the count as history information in the storage section 9, and calculate charges and so on.

As described above, the process for making adjustments in the automatic color determination adjustment processing is terminated.

[Details of ACS Determination Processing at the Time of Scanning]

Figure 5:
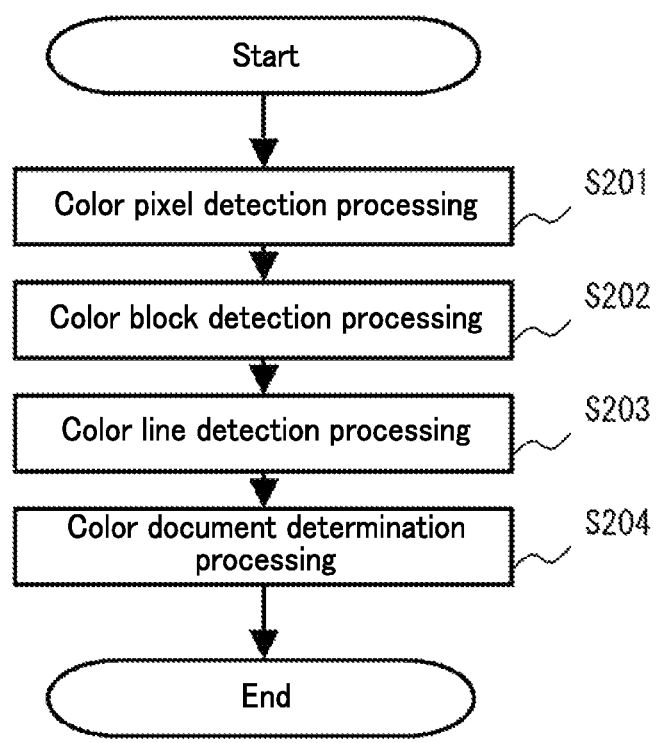
FIG. 5 is a flowchart of ACS determination processing according to an embodiment of the present disclosure.
Figure 6:
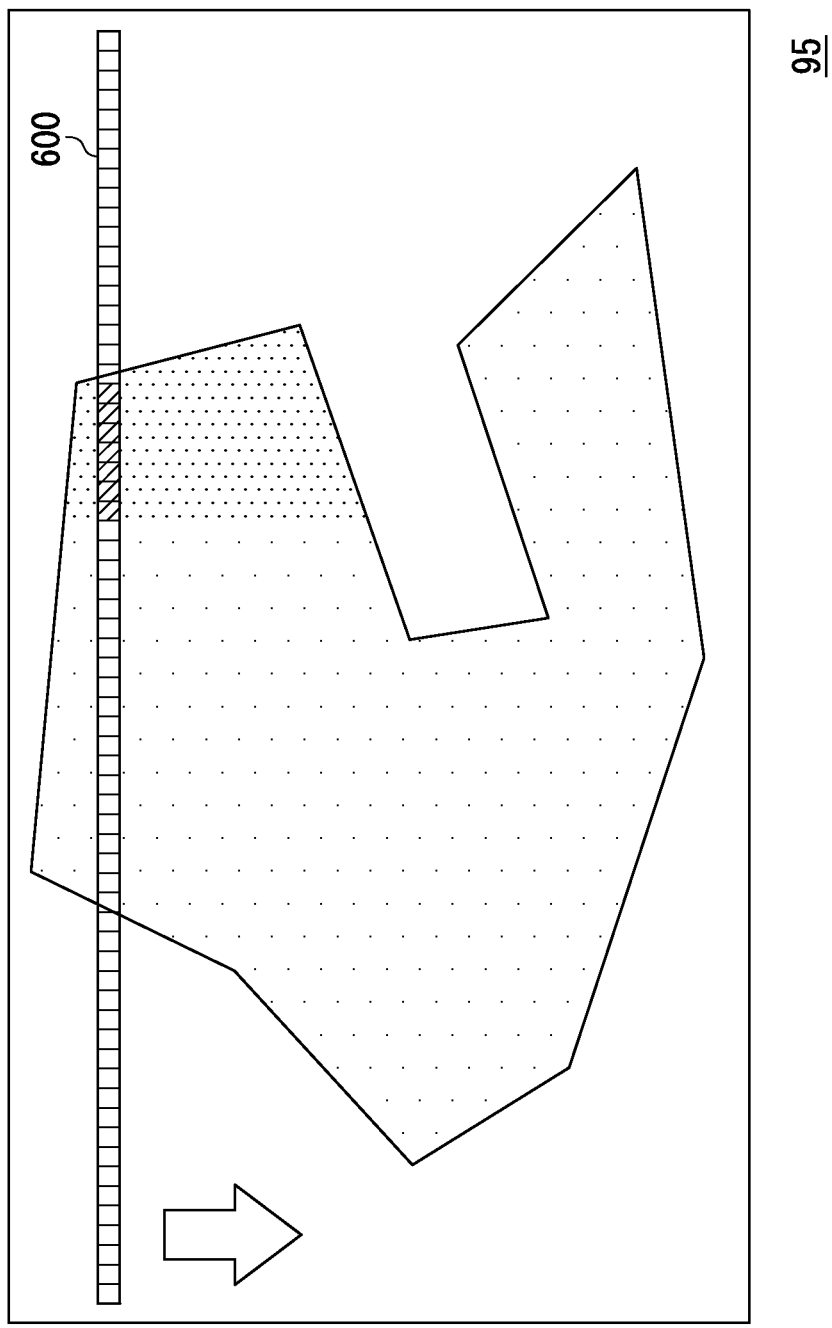
FIG. 6 is a conceptual diagram of color pixel detection according to an embodiment of the present disclosure.

Next, with reference to FIGS. 5 and 6, details of the ACS determination processing in Step S102 in FIG. 4 are described for each step.
(Step S201)

First, the ACS determination section 810 performs color pixel detection processing.

When explained with reference to FIG. 6, the ACS determination section 810 generates, as primary data for each scan line 600 in the scan image data 95, the image data in YUV format that is generated by converting the image data in RGB format of each pixel into the image data in the YUV format. Regarding this conversion, for example, $Y \text{ component} = 0.299 \times R + 0.587 \times G + 0.114 \times B$ $U \text{ component} = -0.14713 \times R - 0.28886 \times G + 0.436 \times B$ $V \text{ component} = 0.615 \times R - 0.51499 \times G - 0.10001 \times B.$ Next, the ACS determination section 810 refers to the color pixel detection threshold in the color threshold setting 91 and determines the pixels to be color pixels when the U component threshold or the V component threshold of the pixels in the image data in the YUV format exceeds the threshold. In FIG. 6, these pixels, which are determined to be color pixels, are shaded.

It should be noted that the ACS determination section 810 may directly detect the color image from a dispersion of the image data in the RGB format and so on, and may determine a color ratio from a color dispersion in the area separated into tiles. In addition, when recognizing the text by OCR and so on and only the text is colored in the background, the entire area may be determined to be colored. Furthermore, the page description language of the job data 92 may be analyzed to calculate the color area or the color pixels may be calculated at the same time when rasterizing. When performing this, it is preferable that the ACS determination section 810 calculate color pixels in units of scan lines. In addition, it is possible to cause the image processing section 10 to perform the color calculation at high speed.
(Step S202)

Next, the ACS determination section 810 performs color block detection processing.

The ACS determination section 810 determines the point where color pixels are continuous on the scan line 600 and counts the number of continuous color pixels. Besides, the ACS determination section 810 further refers to the color block threshold in the color threshold setting 91. The ACS determination section 810 detects a set of continuous color pixels as the point of the color block, when the number of the continuous color pixels is larger than this color block threshold. The ACS determination section 810 calculates, as a size of the color block, the number of continuous color pixels at the point determined to be the color block.

Here, normally, since the color pixels are continuous at a colored point, using the size of the continuous color pixels as an adjustable color block threshold as described later makes it possible to perform determination by continuously changing the size of the color point on the scan line.
(Step S203)

Next, the ACS determination section 810 performs color line detection processing.

The ACS determination section 810 refers to the color line threshold in the color threshold setting 91, and when there is a color block larger than this color line threshold, determines the scan line to be the color line for each scan line 600.

It should be noted that the ACS determination section 810 may use a total value, a mean value, and so on of the sizes of color blocks for the determination of the color line.

(Step S204)

Next, the ACS determination section 810 performs color document determination processing.

The ACS determination section 810 counts, for each page of the scan image data 95, the number of scan lines 600 determined to be color lines as the total number of color lines.

The ACS determination section 810 refers to the color page threshold among the ACS determination thresholds in the color threshold setting 91, and determines that the page should be output in color when this total number of color lines is over this color page threshold, that is, when the total number of color lines belongs to the color mode range.

The ACS determination section 810 determines that the page should be output in monochrome in the other cases, that is, when the total number of color lines belongs to the monochrome mode range.

As described above, the ACS determination processing is completed.

[Details of ACS Determination Threshold Adjustment Processing at the Time of Printing]

Figure 7:
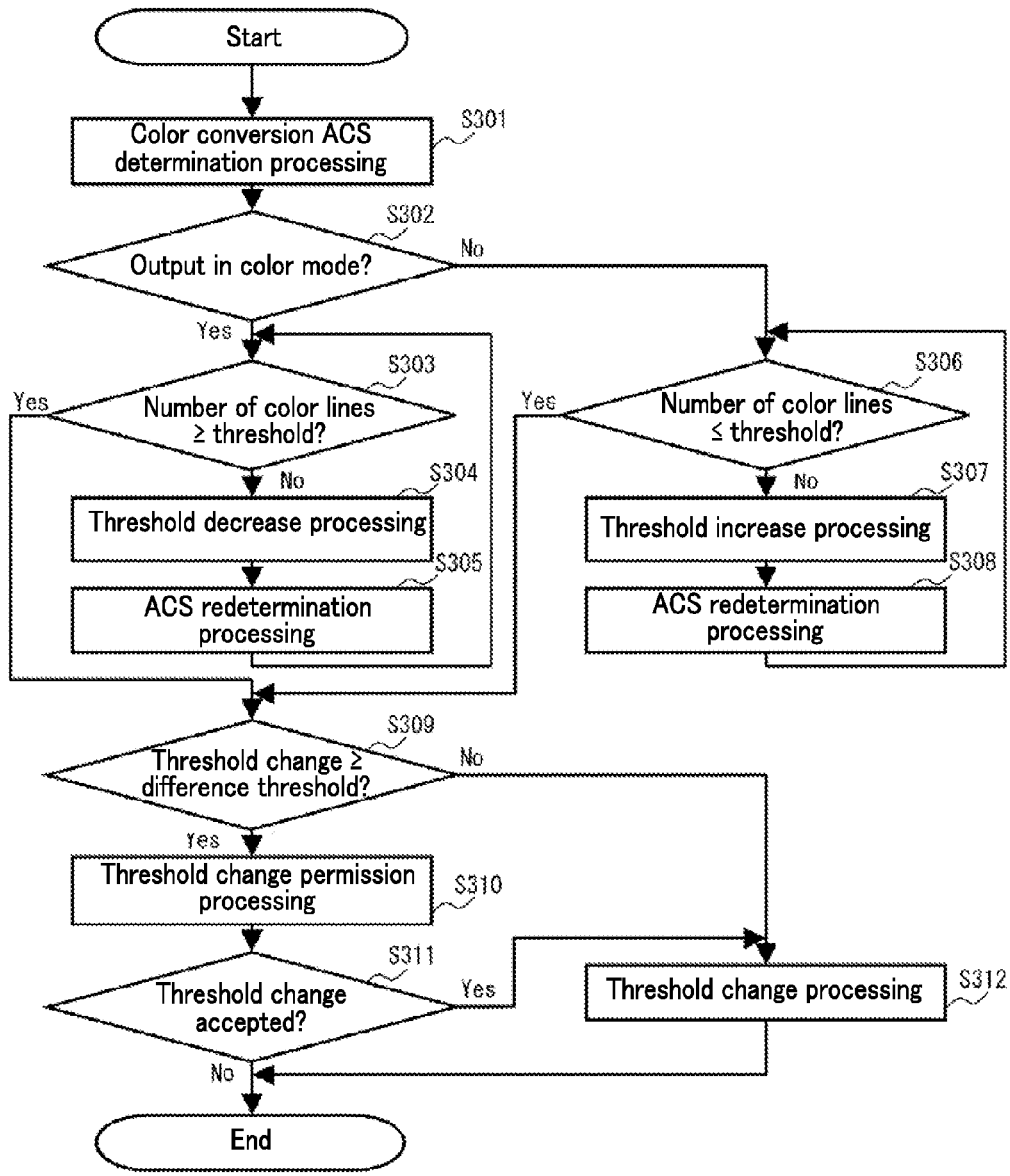
FIG. 7 is a flowchart showing details of document read and output selection processing according to an embodiment of the present disclosure.

Next, details of the ACS determination threshold adjustment processing in the step S105 in FIG. 4 are described for each step, with reference to FIG. 7.

In the ACS determination threshold adjustment processing, each threshold among the ACS determination thresholds in the color threshold setting 91, which is used for the ACS determination processing at the time of scanning in the above step S102, is adjusted based on the mode instruction information 94 and the print image data 93 at the time of print out.

Here, the ACS determination threshold adjustment section 820 can employ, in the processing below, one of the following ACS determination thresholds as the threshold to be adjusted: a threshold for the U component and a threshold for the V component, both of which are color pixel determination thresholds among the ACS determination thresholds, the color block threshold that is a threshold of the number of continuous pixels for determining the color block, the color line threshold for determining the color line, the color page threshold, and so on.

(Step S301)

First, the ACS determination threshold adjustment section 820 performs color conversion ACS determination processing.

The ACS determination threshold adjustment section 820 analyses and rasterizes the page description language in the print data when the job data 92 is the data for the print job or the Fax transmission job. Then, the ACS determination threshold adjustment section 820 generates and incorporates the print image data 93 into the job data 92, and stores the resulting data in the storage section 9. When performing this, the ACS determination threshold adjustment section 820 performs mapping on a color representation range after print out, so as to generate the print image data 93 equivalent to the scan image data 95. In addition, in the other jobs, the color determination adjustment control section 81 may use the print image data 93 of the obtained job data 92 without change.

In addition to this, the ACS determination threshold adjustment section 820, using the ACS determination section 810, determines, from the print image data 93, for each page in the same manner as the ACS determination processing in Step S102 in FIG. 4, whether to output the page in color or in monochrome. In other words, it is determined whether the print image data 93 belongs to the color mode range or the monochrome mode range.

(Step S302)

Next, the ACS determination threshold adjustment section 820 determines, according to the mode instruction information 94, whether or not the user desires the page to be printed in color. In other words, it is determined whether the output such as printing or the like is instructed to be in color or in monochrome. The ACS determination threshold adjustment section 820 determines the result to be Yes when the mode instruction information 94 instructs the color output. The ACS determination threshold adjustment section 820 determines the result to be No in the other cases, that is, when the monochrome output is instructed.

In the case of Yes, the ACS determination threshold adjustment section 820 proceeds with the processing to Step S303.

In the case of No, the ACS determination threshold adjustment section 820 proceeds with the processing to Step S306.

(Step S303)

When the mode instruction information 94 instructs color output, the ACS determination threshold adjustment section 820 reads the color page threshold among the ACS determination thresholds in the color threshold setting 91. Then, the ACS determination threshold adjustment section 820 determines whether or not the calculated total number of color lines is not less than the color page threshold. In other words, assuming that the color page threshold is A and the total number of color lines in the scan line 600 (FIG. 6) is B, the ACS determination threshold adjustment section 820 determines whether or not B is not less than A. The ACS determination threshold adjustment section 820 determines the result to be Yes, when B is not less than A. The ACS determination threshold adjustment section 820 determines the result to be No when B is below A.

In the case of Yes, the ACS determination threshold adjustment section 820 proceeds with the processing to Step S309.

In the case of No, the ACS determination threshold adjustment section 820 proceeds with the processing to Step S304.

(Step S304)

When the total number of color lines is below the color page threshold, the ACS determination threshold adjustment section 820 performs threshold decrease processing.

The ACS determination threshold adjustment section 820 adjusts one of the ACS determination thresholds that is to be adjusted by the color threshold setting 91, by performing processing such as decreasing the ACS determination threshold only by a predetermined value. In other words, a threshold among the ACS determination thresholds is adjusted so as to widen the color mode range. This is due to an assumption that: the number of color lines to be detected increases as the threshold decreases as a result of adjusting the threshold as above.

(Step S305)

Next, the ACS determination threshold adjustment section 820 performs ACS redetermination processing.

As with the ACS determination processing in Step S301, the ACS determination threshold adjustment section 820 determines, according to the changed ACS threshold, whether the page should be output in color or should be output in monochrome, from the print image data 93, using the ACS determination section 810. In other words, whether the print image data 93 belongs to the color mode range or the monochrome mode range is redetermined.

Subsequently, the ACS determination threshold adjustment section 820 returns the processing to Step S303.

(Step S306)

When the mode instruction information 94 instructs monochrome output, the ACS determination threshold adjustment section 820 determines whether the calculated total number of color lines is not more than the color page threshold that is the ACS determination threshold in the color threshold setting 91. The ACS determination threshold adjustment section 820 determines the result to be Yes, when the total number is not more than the color page threshold. The ACS determination threshold adjustment section 820 determines the result to be No in the other cases.

In the case of Yes, the ACS determination threshold adjustment section 820 proceeds with the processing to Step S309.

In the case of No, the ACS determination threshold adjustment section 820 proceeds with the processing to Step S307.

(Step S307)

When the total number of color lines is larger than the color page threshold, the ACS determination threshold adjustment section 820 performs threshold increase processing.

The ACS determination threshold adjustment section 820 adjusts one of the ACS determination thresholds, which is adjusted at the color threshold setting 91, by performing processing such as increasing the ACS determination threshold only by a predetermined value, and so on. In other words, the ACS determination threshold is adjusted so as to widen the monochrome mode range. This is due to an assumption that: the number of color lines to be detected decreases as the threshold increases as a result of adjusting the threshold as above.

(Step S308)

Next, the ACS determination threshold adjustment section 820 performs ACS redetermination processing. This processing is performed in the same manner as Step S305.

Subsequently, the ACS determination threshold adjustment section 820 returns the processing to Step S306.

(Step S309)

Here, when the conditions in Steps S303 to S308 are satisfied and the adjustment of the threshold according to the mode instruction information 94 is successfully performed, the ACS determination threshold adjustment section 820 refers to the difference threshold in the color threshold setting 91 and determines whether or not the difference value between the color determination threshold before the adjustment by the ACS determination threshold adjustment section 820 and the color determination threshold to be adjusted by the ACS determination threshold adjustment section 820 is not less than the difference threshold. In other words, when assuming that C is the ACS determination threshold before adjustment, D is the ACS determination threshold after adjustment, X is a threshold of the difference between the color determination threshold before the adjustment by the ACS determination threshold adjustment section 820 and the color determination threshold to be adjusted by the ACS determination threshold adjustment section 820, the ACS determination threshold adjustment section 820 determines whether or not an absolute value |D−C| that is a difference value is not less than X. This is because when the difference between the threshold C in the ACS determination threshold before adjustment and the threshold D that is a candidate to be adjusted exceeds the predetermined threshold X, there is a possibility that the difference changes greatly compared to the determination result of the current situation. The ACS determination threshold adjustment section 820 determines the result to be Yes when the difference value is not less than X. The ACS determination threshold adjustment section 820 determines the result to be No in the other cases.

In the case of Yes, the ACS determination threshold adjustment section 820 proceeds with the processing to Step S310.

In the case of No, the ACS determination threshold adjustment section 820 proceeds with the processing to Step S312.

(Step S310)

When the change in the threshold is not less than the difference threshold, the ACS determination threshold adjustment section 820 performs threshold change permission processing.

The ACS determination threshold adjustment section 820 displays a question (dialog) such as "Do you wish to change ACS threshold setting?" on the display section in the operation panel section 6, and prompt the user to enter an instruction through the touch panel 61 or the button section 62. In addition, the ACS determination threshold adjustment section 820 also allows, confirming the user's intent through the driver section 210 in the terminal 200 via the interface section 830.

It should be noted that this processing may be omitted when a permission for changing the threshold has been set for the driver section 210 of the terminal 200 by settings such as "automatic color determination adjustment".

(Step S311)

Next, the ACS determination threshold adjustment section 820 determines whether or not the change in the threshold has been permitted by the user. The ACS determination threshold adjustment section 820 determines the result to be Yes when there is a permission. The ACS determination threshold adjustment section 820 determines the result to be No when there is no permission.

In the case of Yes, the ACS determination threshold adjustment section 820 proceeds with the processing to Step S312.

In the case of No, the ACS determination threshold adjustment section 820 completes the ACS determination threshold adjustment processing. With this, the ACS determination threshold adjustment section 820 returns the changed threshold to an initial value.

(Step S312)

When the change of the threshold is below the difference threshold, or when the change is permitted by the user, the ACS determination threshold adjustment section 820 performs threshold change processing.

In other words, the ACS determination threshold adjustment section 820 reflects the setting of the changed threshold in the ACS determination threshold in the color threshold setting 91. In addition, the ACS determination threshold adjustment section 820 also reflects these values in the threshold information in the account setting 90.

With this, it is possible to perform ACS determination using the changed threshold in subsequent operations such as copy, scan, remote scan, and so on.

As described above, the ACS determination processing is completed.

With the configuration as described above, it is possible to produce advantageous effects as follows.

An image forming apparatus 1 according to an embodiment of the present disclosure can easily control a threshold used for determining, in performing ACS at the time of copying and scanning, whether to perform output in color or in monochrome, based on the mode instruction information 94 and the color pixel information of the output image. With this, the user need not take the trouble of reading the document to adjust ACS each time or print out the read document for adjustment. In other words, it becomes possible to easily reduce errors in the determination as to whether the mode is in color or monochrome, only by the operation to specify the mode for printing (color mode and monochrome mode).

In addition, with the image forming apparatus 1 according to the present embodiment, it is possible to correct, for printout, the threshold for determining whether to output in color or in monochrome by setting, through the printer driver, whether the output image is an "image desired to be output in color" or an "image desired to be output in monochrome" at the time of copying and scanning for ACS. Such a configuration saves the user the trouble of going to the image forming apparatus 1 so as to adjust the ACS level and having the document read by the image forming apparatus 1, thus easily reducing errors in the determination as to color or monochrome.

Embodiment 2

Configuration of the Image Forming Apparatus 1

With reference to FIGS. 1 and 2, the configuration of the image forming apparatus 1 according to a second embodiment of the present disclosure will be described. For a part where descriptions are overlapped, such descriptions are omitted because the color determination adjustment control section 81 in the image forming apparatus 1 has the same configuration as the color determination adjustment control section 81 in the image forming apparatus 1 as described in the first embodiment, except for further having a user instruction acceptance section, a mode switching section, and an other-page identical setting section.

The color determination adjustment control section 81 further has the user instruction acceptance section, the mode switching section, and the other-page identical setting section.

When the mode indicated by the instruction information is different from the mode determined at the mode determining section, the user instruction acceptance section notifies the user to ask whether or not to change the mode indicated the instruction information, and accepts the instruction confirmed by the user.

The mode switching section determines, based on the instruction confirmed by the user, in which mode of the color mode and the monochrome mode the image data is present.

When the other-page identical setting section accepts, for one page data among a plurality of page data, the instruction confirmed by the user at the user notice instruction receiving section and determines in which mode, the color mode or the monochrome mode, the one page data is, the other-page identical setting section determines the mode of the other page data among a plurality of page data to the determined mode.

[Automatic Color Determination Adjustment Processing by the Image Forming Apparatus 1]

Next, with reference to FIGS. 8 and 9, the automatic color determination adjustment processing by the image forming apparatus 1 according to the second embodiment of the present disclosure will be described. In the automatic color determination adjustment processing according to the second embodiment, even if the user has specified the color mode or the monochrome mode, it is determined whether the document is colored or monochrome using ACS. Then, when the color mode specified by the user and the result of the determination by ACS are the same, output is performed according to the mode specified by the user. However, when the mode specified by the user and the result of the determination by ACS are different, it is possible to consider that there is a specification error and so on, and therefore the user is notified once, and a second instruction is obtained. According to this second instruction, the mode is switched. Here, only in the case where the mode determined by ACS is monochrome although the user has instructed the color mode, and the second instruction of the user, however, indicates the color mode again, the ACS threshold is adjusted. With this, it is possible to prevent user errors in specifying the mode and prevent an unintended adjustment of the ACS threshold, thus allowing enhancing user's usability.

Figure 8:
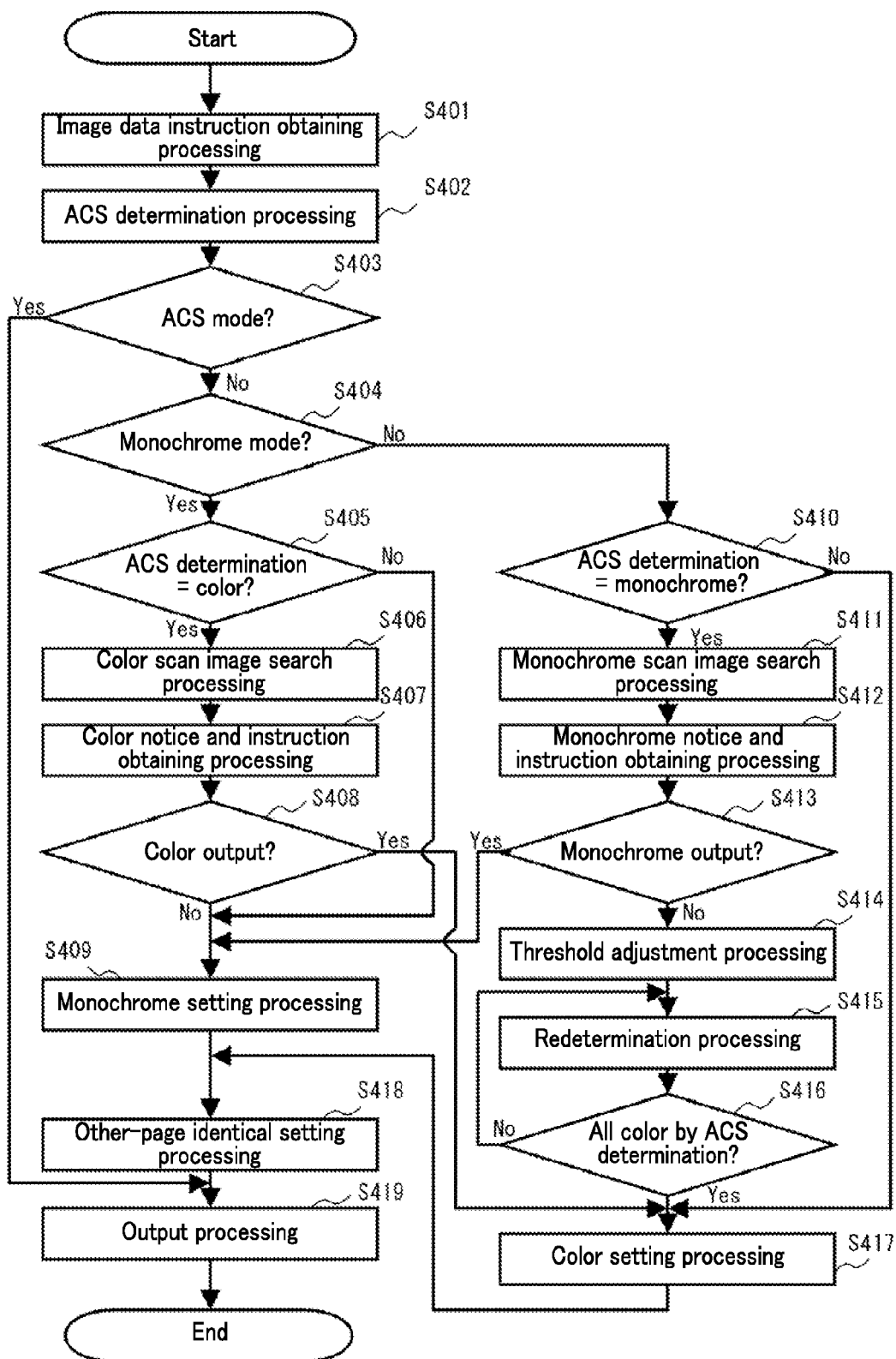
FIG. 8 is a flowchart of automatic color determination adjustment processing according to an embodiment of the present disclosure.

The following describes, according to each step, the automatic color determination adjustment processing according to the present embodiment, with reference to the flowchart in FIG. 8. The following processing is executed mainly by the color determination adjustment control section 81 in the control section 8, using a hardware resource according to the program stored in the storage section 9.
(Step S401)

First, the color determination adjustment control section 81 performs scan image input processing.

Here, the user places the document on a document feeder or contact glass of the document placement section 31 in the image forming apparatus 1.

When receiving, from the user, instructions such as copy, scan, remote scan, facsimile transmission, and so on through the touch panel 61 or the button section 62 in the operation panel section 6, the color determination adjustment control section 81 instructs the document reading section 2 to optically read the placed document.

In performing this, the color determination adjustment control section 81 obtains, through the operation panel section 6, the mode instruction information 94 that is information indicating one of the color mode, the monochrome mode, and the ACS mode, and stores the mode instruction information 94 in the storage section 9. This instruction is set to a default (given) setting that is stored in the storage section 9, when the user does not particularly make a selection.

The image data read by the document reading section 2 is image processed by the image processing section 10, and is stored in the storage section 9 as the scan image data 95.
(Step S402)

Next, the color determination adjustment control section 81 performs ACS determination processing.

The color determination adjustment control section 81 performs ACS determination on the scan image data 95 for each page, regarding whether the image data is to be output in color or to be output in monochrome, with reference to the color threshold setting 91.

In other words, the color determination adjustment control section 81 according to the present embodiment performs ACS determination on all the scan image data 95 even if the ACS mode is not specified by the user.

The color determination adjustment control section 81 stores once the ACS determination in the storage section 9 as a setting for document output.

It should be noted that: the color determination adjustment control section 81, irrespective of the result of the ACS determination, may output the image at the image forming section 7 first in either the color mode or the monochrome mode that is designated by the user.
(Step S403)

Next, the color determination adjustment control section 81 determines whether or not the ACS mode has been specified by the user. The color determination adjustment control section 81 determines the result to be Yes when the mode instruction information 94 indicates the ACS mode. The color determination adjustment control section 81 determines the result to be No in the other cases.

In the case of Yes, the color determination adjustment control section 81 proceeds with the processing to Step S419, and outputs the scan image data 95 according to the result of the determination of the mode by ACS.

In the case of No, the color determination adjustment control section 81 proceeds with the processing to Step S404.

(Step S404)

When the mode other than the ACS mode has been instructed by the user, the color determination adjustment control section 81 determines whether or not the user has specified the monochrome mode. Here, the color determination adjustment control section 81 determines the result to be Yes, when the mode instruction information 94 indicates the monochrome mode. The color determination adjustment control section 81 determines the result to be No in the other cases, that is, when the color mode is indicated.

In the case of Yes, the color determination adjustment control section 81 proceeds with the processing to Step S405.

In the case of No, the color determination adjustment control section 81 proceeds with the processing to Step S410.

(Step S405)

When the monochrome mode is instructed by the user, the color determination adjustment control section 81 determines whether or not the color mode has been determined by the ACS determination. In the ACS determination processing in Step S402, the color determination adjustment control section 81 determines the result to be Yes, when the scan image data 95 includes a page determined to be colored. The color determination adjustment control section 81 determines the result to be No in the other cases.

In the case of Yes, the color determination adjustment control section 81 proceeds with the processing to Step S406.

In the case of No, the color determination adjustment control section 81 proceeds with the processing to Step S409.

(Step S406)

When the color mode is determined by ASC determination although the monochrome mode is indicated, the color determination adjustment control section 81 performs color scan image search processing.

The color determination adjustment control section 81 detects, from the scan image data 95, a page also detected as a color page by ACS determination, and stores the detected page in the storage section 9. In performing this, the color determination adjustment control section 81 may generate the data such as a thumbnail image and so on from the page detected to be colored, and store the data in the storage section 9.

It should be noted that: in the case where the scan image data 95 has already been output earlier irrespective of the result of the ACS determination, the color determination adjustment control section 81 holds, without deleting, the scan image data 95 stored in the storage section 9.

(Step S407)

Next, the color determination adjustment control section 81 (user notice instruction acceptance section) performs color notice and instruction obtaining processing.

The color determination adjustment control section 81 (user notice instruction acceptance section) displays, on the display section of the operation panel section 6, a question (dialog) regarding a possibility of difference in the mode, such as "A color page is detected. Do you wish to change to the color mode?". In other words, the color determination adjustment control section 81 (user notice instruction acceptance section) notifies the user to ask whether or not the mode (monochrome mode) indicated by the instruction information by the user is to be changed. The color determination adjustment control section 81 (user notice instruction acceptance section) prompts the user to enter the instruction confirmed by the user through the touch panel 61 or the button section 62 in the operation panel section 6. When the instruction confirmed by the user is entered, the color determination adjustment control section 81 (user notice instruction acceptance section) accepts the instruction confirmed by the user.

It should be noted that: in the case where the output has been performed earlier irrespective of the result of the ACS determination, the color determination adjustment control section 81 (user notice instruction acceptance section) may notice, in the dialog, that re-output is possible.

In addition, the color determination adjustment control section 81 (user notice instruction acceptance section) can also perform confirm the intent of the user in the same manner through an external terminal not shown.

(Step S408)

Next, the color determination adjustment control section 81 determines whether or not the user has instructed to change to the color mode. The color determination adjustment control section 81 (mode switching section) determines the result to be Yes, when the user instructs to switch to the color mode. In other words, the color determination adjustment control section 81 (mode switching section) determines the image data to be in the color mode. The color determination adjustment control section 81 (mode switching section) determines the result to be No in the other cases. In other words, the color determination adjustment control section 81 (mode switching section) determines the image data to be in the color mode.

In the case of Yes, the color determination adjustment control section 81 proceeds with the processing to Step S417.

In the case of No, the color determination adjustment control section 81 proceeds with the processing to Step S409.

(Step S409)

Here, the color determination adjustment control section 81 performs monochrome setting processing.

In other words, the color determination adjustment control section 81 performs setting such that the scan image data 95 is output in monochrome in the case where: the user instructs the monochrome mode, and the monochrome mode is also determined by ACS; the image is determined to be colored by ACS although the user has instructed the monochrome mode, and the monochrome mode is instructed again; or the user has instructed to output in the color mode, and the monochrome output is determined by the ACS determination, and the user instructs a change to the monochrome mode.

Subsequently, the color determination adjustment control section 81 proceeds with the processing to Step S418.

(Step S410)

When the user instructs to output in the color mode, the color determination adjustment control section 81 determines whether or not the determination by ACS was monochrome. The color determination adjustment control section 81, in the ACS determination processing in Step S402, determines the result to be Yes if the scan image data 95 includes a page determined to be monochrome. The color determination adjustment control section 81 determines the result to be No in the other cases.

In the case of Yes, the color determination adjustment control section 81 proceeds with the processing to Step S411.

In the case of No, the color determination adjustment control section 81 proceeds with the processing to Step S417.

(Step S411)

When the ACS determination is monochrome although the color mode was instructed, the color determination adjustment control section 81 performs monochrome scan image search processing.

The color determination adjustment control section 81 detects, from the scan image data 95, a page also detected as monochrome in the ACS determination, and stores the detected page in the storage section 9. In performing this, the color determination adjustment control section 81 may generate the data such as a thumbnail image and so on from the page detected to be monochrome and store the data in the storage section 9.

It should be noted that: in the case where the scan image data 95 has been output earlier irrespective of the determination result of ACS, the color determination adjustment control section 81 performs control so as to hold, without deleting, the scan image data 95 in the storage section 9.
(Step S412)

Next, the color determination adjustment control section 81 (user notice instruction acceptance section) performs monochrome notice and instruction obtaining processing.

The color determination adjustment control section 81 (user notice instruction acceptance section), as with the color notice and instruction obtaining processing in Step S407, displays a dialog such as "A monochrome page is detected. Do you wish to change to the monochrome mode?" and prompts the user to enter a second instruction at the operation panel section 6. In other words, the color determination adjustment control section 81 (user notice instruction acceptance section) notifies the user to ask whether or not the mode (color mode) indicated by the instruction information by the user is to be changed.

The color determination adjustment control section 81 (user notice instruction acceptance) section receives the user's confirmation and instruction when the user's confirmation and instruction is entered.

In addition, the color determination adjustment control section 81 may notify that the re-output is possible in the case where the image data has been output already. In addition, an instruction may be obtained from an external terminal.
(Step S413)

Next, the color determination adjustment control section 81 determines whether or not the user has instructed to change to the monochrome mode. The color determination adjustment control section 81 determines the result to Yes, when the user instructs to change to the monochrome mode. The color determination adjustment control section 81 determines the result to be No in the other cases.

In the case of Yes, the color determination adjustment control section 81 proceeds with the processing to Step S409.

In the case of No, the color determination adjustment control section 81 proceeds with the processing to Step S414.
(Step S414)

With a permission of the user, the color determination adjustment control section 81 performs threshold adjustment processing.

The color determination adjustment control section 81 calculates the number of color pixels in the scan image data 95 and adjusts, based on this, the ACS determination thresholds in the color threshold setting 91. Here, the ACS determination thresholds are adjusted such that the image data is it more likely to be determined to be colored. The color determination adjustment control section 81, for example, adjusts the threshold for the color/monochrome determination such that the image data is more likely to be determined to be colored, or makes adjustments by changing the threshold according to a ratio of the colored pixels such that even a document having a small color portion can be determined to be the color document, thus making it possible to determine the document to be colored with accuracy.

The color determination adjustment control section 81 reflects the setting of the changed threshold in the ACS determination thresholds in the color threshold setting 91. In addition, the color determination adjustment control section 81 reflects these values in the threshold information in the account setting 90.

With this, it becomes possible to perform the determination by ACS using the changed ACS determination thresholds in the subsequent copying, scanning, remote scanning, and so on.

It should be noted that this ACS determination threshold in the color threshold setting 91 may be stored in the account setting 90, and the ACS determination may be performed with a different ACS determination threshold for each user.
(Step S415)

Here, the color determination adjustment control section 81 performs redetermination processing.

The color determination adjustment control section 81 performs the ACS determination again, using the ACS determination threshold in the color threshold setting 91 that is adjusted, on the page included in the scan image data 95 and determined to be monochrome by ACS.
(Step S416)

Next, the color determination adjustment control section 81 determines whether or not all the pages on which the ACS determination has been performed again are determined to be colored.

In the case of Yes, that is, when all the pages are determined to be colored, the color determination adjustment control section 81 proceeds the processing to Step S417.

In the case of No, that is, when there is a page not determined to be colored, the color determination adjustment control section 81 returns the processing to Step S415 and adjusts the threshold again.
(Step S417)

Here, the color determination adjustment control section 81 performs color setting processing.

The color determination adjustment control section 81 performs setting so as to output the scan image data 95 in color when: the image was determined to be monochrome by ACS although the user has instructed the color mode, and the user instructs to change to the color mode; the user has instructed to output in the color mode and the image is determined to be colored by ACS; or the image is determined to be colored by ACS although the user has instructed the monochrome mode, and the mode is changed to the color mode.

Subsequently, the color determination adjustment control section 81 proceeds with the processing to Step S418.
(Step S418)

After completion of the color setting processing or monochrome setting processing, the color determination adjustment control section 81 (other-page identical setting section) performs the other-page identical setting processing.

The color determination adjustment control section 81, unlike the user instruction for the color mode or the monochrome mode in the mode instruction information 94, performs settings such that the output is performed according to the user's instruction, on another page determined to be colored by ACS in the color scan image search processing in Step S406 described above, another page determined to be monochrome by ACS in the monochrome scan image search processing in Step S411.

It should be noted that the color determination adjustment control section 81 may display the above thumbnail image in the display section of the operation panel 6 and may prompt the user to select whether to output in color or monochrome for each page.
(Step S419)

Here, the color determination adjustment control section 81 performs output processing.

The color determination adjustment control section 81 causes the image forming section 7 to print the scan image data 95 according to the setting for the output of the scan image data 95 as described above. In performing this, when the page is set for monochrome output, the color determination adjustment control section 81 converts the scan image data 95 from the CMYK colors to monochrome by predetermined weighting and prints the converted image data. After the printing, the color determination adjustment control section 81 may delete the scan image data 95 in the storage section 9.

It should be noted that the color determination adjustment control section 81 may perform, other than the printing by the image forming section 7, creating a PDF file, facsimile transmission and receiving from the FAX transmission and receiving section, transmission to another terminal not shown, uploading to the server, and so on.

In addition, the color determination adjustment control section 81 may count outputs in color or in monochrome, respectively and store the counts in the storage section 9 as history information, and calculate charges and so on.

As described above, the automatic color determination adjustment processing is completed.

[Example of Processing in the Automatic Color Determination Adjustment Processing]

Here, with reference to FIG. 9, an example of processing in the automatic color determination adjustment processing according to an embodiment of the present disclosure will be described.

<Case A>

The mode specified by the user: monochrome

The result of the ACS determination: color

In such cases, one of the following cases can be considered where: the user has wrongly instructed the monochrome output for the color document, or the user has specified the monochrome mode although the document actually included a color portion, judging that the monochrome mode was sufficient.

Therefore, the color determination adjustment control section 81 gives notice to the user for confirmation without performing output immediately. According to the content of the notice, the user reselects whether to output in the monochrome mode without change or to output in the color mode, and gives a second instruction. The color determination adjustment control section 81 performs output according to this second instruction.

<Case B>

The mode specified by the user: color

The result of ACS determination: monochrome

In such a case, it is possible to consider that the result of the ACS determination was monochrome for reasons that the user has wrongly instructed the color output for the monochrome document, or the document actually including a color portion was determined to be monochrome by the ACS determination for reasons that the area of the color portion was small, and so on.

Also in this case, the color determination adjustment control section 81, as with the case A, gives notice to the user without performing output immediately, and confirms whether or not to perform output. When the user instructs to change the monochrome mode, it is possible to consider that the user has made a wrong specification. Therefore, the mode is changed to the monochrome mode so as to perform output, and thus the processing is completed.

When the user instructs to output in the color mode as initially specified, it is possible to consider that the document is a color document that slightly includes a color portion. Therefore, the ACS determination threshold is adjusted. This is because the document, which is actually a color document, was wrongly determined to be monochrome by ACS.

With the configuration as described above, it is possible to obtain the following advantageous effects.

In a general image forming apparatus, even when the user specified the color mode or the monochrome mode, it often happened that the actual mode was different from the intended mode. In other words, for a reason that the user has forgot to specify the color mode, and there were cases where the wrong mode was specified.

If the monochrome document was wrongly copied in the color mode, it would end up wasting the toner, and if the color document was wrongly copied in monochrome, an unappealing output which had lost expressiveness by color was obtained. Besides, the user had to reset the document to take another copy, thus requiring additional work.

By contrast, the image forming apparatus 1 according to an embodiment of the present disclosure can effectively prevent an output unintended by the user as a result of the wrong specification of the mode.

In addition, according to the content instructed by the user, it is also possible to automatically adjust the ACS function.

In addition, in the second embodiment as described above, it has been described that the ACS threshold is adjusted only when the mode is determined to be monochrome mode by ACS although the user has instructed the color mode, but this is not the only case. In other words, when the color mode was determined by ACS although the user has instructed the monochrome mode, the threshold for ACS may also be adjusted.

In addition, in the embodiment as described above, it has been described that the instruction for the color mode or the monochrome mode is to be performed when the user provides the second instruction, but this is not the only case and the configuration may be such that the ACS mode is constructed.

It should be noted that the image forming apparatus 1 according to each of the first and the second embodiments is also applicable to an information processing apparatus other than the image forming apparatus.

In addition, the image forming apparatus 1 may have a configuration in which the scan image data 95 generated by another image forming apparatus 1, or a scanner or network scanner that is additionally connected. In other words, an image input method as described in this embodiment is not intended to limit the scope of the present disclosure to the embodiment by itself, but is a mere example for description.

In addition, the image forming apparatus 1 may employ the processing as described in the present embodiment, not only for printing but also for scanning or creating files such as PDF and so on.

In addition, in the embodiments as described above, a threshold based on the image data in the YUV format and the blocks in scan lines has been described as the ACS determination threshold, but not limited to this, and automatic adjustment may be performed using: a threshold such as density, the image data in the RGB format, saturation, brightness, and so on; a threshold of color difference from peripheral pixels; a parameter for a statistical color model; and so on.

It should be noted that the configuration and the operation in the above embodiments are mere examples, and it goes without saying that such examples can be appropriately modified and executed within a scope not departing from the content of the present disclosure.

What is claimed is:

1. An image processing device comprising:
   a mode instruction information obtaining section configured to obtain, from a user, instruction information that indicates in which mode, a color mode or a monochrome mode, image data is to be output;

a color determination threshold storage section configured to store a color determination threshold that specifies which mode range, a color mode range or a monochrome mode range, the image data belongs to;

a mode determination section configured to determine the mode to be the color mode, using the color determination threshold, when the image data belongs to the color mode range, and to determine the mode to be the monochrome mode, using the color determination threshold, when the image data belongs to the monochrome mode range; and an automatic color determination threshold adjustment section configured to adjust the color determination threshold so as to widen the mode range corresponding to the mode determined by the mode determination section, when the mode indicated by the instruction information obtained by the mode instruction information obtaining section is different from the mode determined by the mode determination section.

2. An image processing device according to claim 1, wherein
the image data includes a plurality of pixel data,
the color determination threshold includes:
a U component threshold and a V component threshold each for detecting color pixels in the plurality of pixel data;
a color block threshold for determining, to be a color block, a point where the color pixels continue on a sub-scanning line in the image data;
a color line threshold for determining the sub-scanning line to be a color line, based on a size of the color block; and
a color page threshold for determining, based on a ratio of the color line, which mode, the color mode or the monochrome mode, the image data is to be in, and wherein
the mode determination section
checks that the image data is in YUV format, and detects the image data in the YUV format as the color pixels when a U component in each pixel data on the sub-scanning line in the image data in the YUV format exceeds the U component threshold or when a V component in each pixel data on the sub-scanning line in the image data in the YUV format exceeds the V component threshold,
determines the color pixels to be the color block when the number of continuous color pixels among the determined color pixels on the sub-scanning line in the image data is not less than the color block threshold,
determines the color block to be the color line when a size of the color block on the sub-scanning line in the image data is not less than the color line threshold,
determines the mode to be the color mode when the total number of the color lines determined in the image data is not less than the color page threshold, and determines the mode to be the monochrome mode in another case.

3. An image processing device according to claim 1, wherein
the color determination threshold storage section stores a difference threshold for determining a difference between the color determination threshold before adjusted by the automatic color determination threshold adjustment section and a color determination threshold to be adjusted by the automatic color determination threshold adjustment section, and
the automatic color determination threshold adjustment section calculates a difference value between the color determination threshold before adjusted by the automatic color determination threshold adjustment section and the color determination threshold to be adjusted by the automatic color determination threshold adjustment section, and asks whether or not to adjust the color determination threshold when the difference value is not less than the difference threshold.

4. An image processing device according to claim 1, wherein
the mode determination section redetermines, using the color determination threshold adjusted by the automatic color determination threshold adjustment section, in which mode, the color mode or the monochrome mode, the image data is to be in.

5. An image processing device according to claim 1, further comprising:
a user notice instruction acceptance section configured to provide a notice to a user to ask whether or not to change the mode and accept an instruction confirmed by the user, when the mode indicated by the instruction information is different from the mode determined by the mode determination section; and
a mode switching section configured to determine, based on the instruction confirmed by the user, which mode, the color mode or the monochrome mode, the image data is to be, wherein
when the mode indicated by the instruction information is different from the mode determined by the mode determination section and when the instruction confirmed by the user is same as the mode indicated by the instruction information, the automatic color determination threshold adjustment section adjusts the color determination threshold.

6. An image processing device according to claim 5, wherein
the image data includes a plurality of page data,
the image processing device further comprising
an other-page identical setting section configured to determine, when the instruction confirmed by the user is accepted by the user notice instruction acceptance section for one page data among the plurality of page data and the one page data is determined to be in one of the color mode and the monochrome mode, the mode of other page data among the plurality of page data to be the mode determined for the one page data.

7. An image processing device according to claim 1, further comprising
a reading section configured to read a document and generate the image data.

* * * * *